March 10, 1959 J. E. FLAGG ET AL 2,876,453
SEPARABLE WRIST BEARING
Filed April 20, 1956
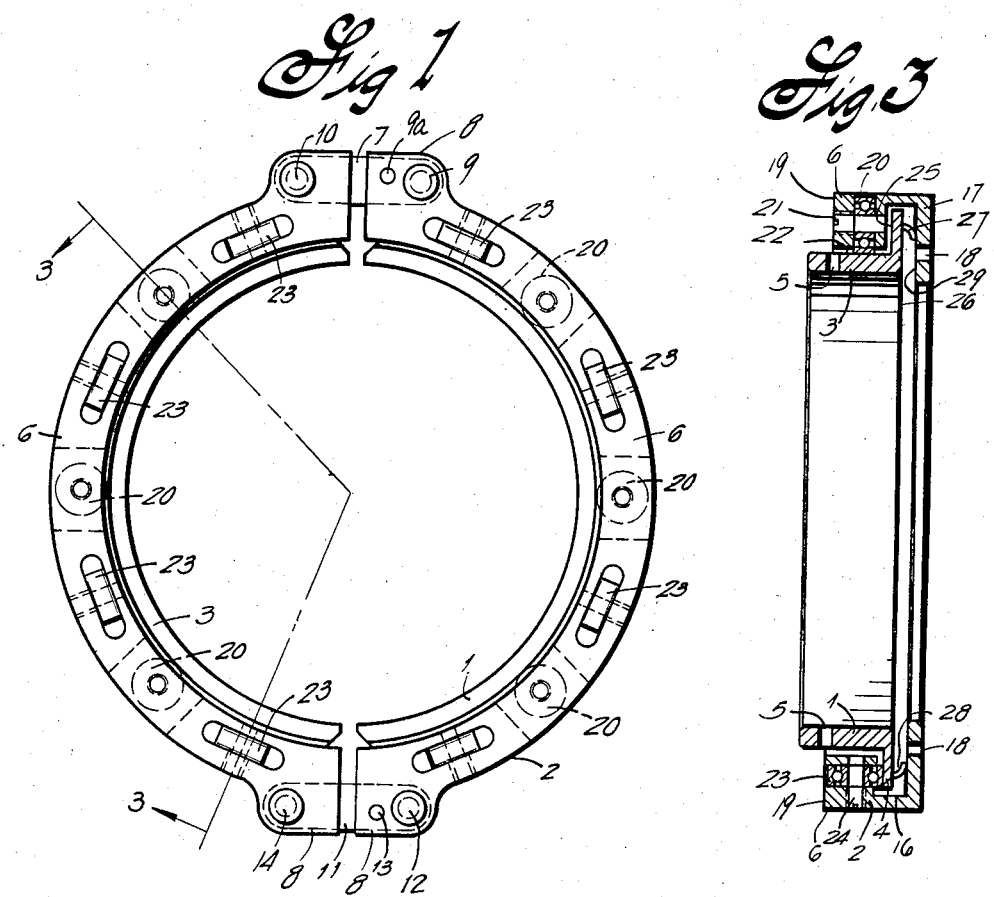
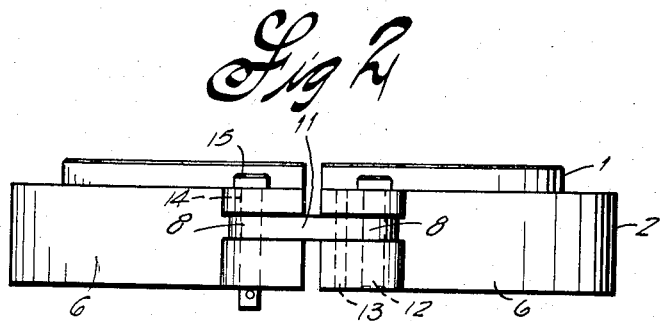
INVENTOR.
John E. Flagg
Joseph A. Ruseckas
BY
Attorneys

2,876,453

SEPARABLE WRIST BEARING

John E. Flagg and Joseph A. Ruseckas, Worcester, Mass., assignors, by mesne assignments, to the United States of America as represented by the Secretary of the Navy Application April 20, 1956, Serial No. 579,699

1 Claim. (Cl. 2—2.1)

This invention relates to a separable bearing unit which may be used with pressurized garments.

The advancement of aviation has brought about a great need for pressurized garments for use by flying personnel. Because of their particular function, these pressurized garments are very close fitting and conformal to the body contours. It it therefore necessary that the garments be provided with means allowing the wearer to perform the normal physical activities required of him for the proper operation of the aircraft. This invention provides a bearing element permitting relative rotation between elements so that normal activities may be followed.

This invention involves a separable bearing unit with an inner and outer race each having means thereon for attachment to different elements of a pressurized suit. The outer race has a plurality of minature roller bearings mounted therein to compensate for radial action and for thrust. A sealing flap mounted on the inner race renders the unit gas tight and also permits the attachment of elements to either race, allowing them to rotate freely, while at the same time transmitting a gas or fluid.

It is an object of this invention to provide a bearing unit for use in a pressurized garment.

It is a further object of this invention to provide a separable bearing unit having means to compensate for radial action and for thrust.

Other objects and many of the attendant advantages of this invention will be readily appreciated as the same becomes better understood by reference to the following detailed description when considered in connection with the accompanying drawings wherein:

Figure 1 is a top plan view of the separable bearing unit.

Figure 2 is a side elevation showing the locking structure.

Figure 3 is a cross-sectional view taken along lines 3—3 of Figure 1.

In the drawings there is disclosed a separable bearing unit having an inner race indicated generally as 1 and an outer race indicated generally as 2. The inner race consists of two separate arcuate sections 3 each having a flange 4 on the lower end. The inner race is further provided with a plurality of openings 5 in the side wall to which an element of the pressurized garment may be secured.

The outer race consists of two substantially semi-circular sections 6 hingedly joined at one of their ends. A link 7 is received in a transverse slot 8 cut in each of the ends of the sections 6. The link 7 is rigidly secured in one of the sections 6 by a fixed pin 9 and a removable pin 9a. A pivot pin 10 extending through openings in the other section 6 and the link 7 allows for relative pivotal motion between the sections 6. At the other end, the sections are joined by a locking bar 11 which is pivotally connected to one section by the pin 12. A removable pin 13 passing through openings in the locking bar 11 and section 6 rigidly secures the locking bar to the section. A removable locking pin 14 extending through aligned openings in the section 6 and the locking bar 11 secures the separable sections 6 together. A head 15 allows for easy removal of the pin 14.

Each of the outer race sections 6 has an inner cut out portion 16 adapted to receive the flange 4 of the inner race. The lower end 17 of the outer race has a plurality of openings 18 to which an element of the pressurized garment may be secured. In the upper end 19 of the sections 6 there is a plurality of miniature roller bearings 20 mounted on pins 21 extending parallel to the longitudinal axis of the separable bearing unit and the bearings 20 engage the side walls 22 of the inner race. These bearings 20 compensate for radial action. Also mounted for rotation in the upper end 19 are a plurality of miniature roller bearings 23 that compensate for thrust. The bearings 23 are journaled for rotation on pins 24. The longitudinal axis of each pin 24 lies on a radius line of the semi-circular sections 6. The bearings 23 engage the upper side 25 of the flanges 4.

Secured to the under side 26 of the flanges 4 is a sealing flap 27. The flap 27 is curved 28 toward the longitudinal axis of the separable bearing unit so that any pressures within the unit will tend to force the sealing unit against the upper side 29 of the outer race and thereby form a more effective gas tight seal.

In operation the inner race sections 3 are secured to an element of the pressurized garment by means of the openings 5. The outer race is secured to another element of the pressurized garment by means of the openings 18. The two sections 6 of the outer race are pivoted apart and placed over the inner race so that the flange 4 of the inner race sections lies in the recess 16 of the outer race sections. The outer race is then secured in position by the locking bar 11 and pin 13 thus securing the two elements of the pressurized garment together. The bearings 20 and 23 allow relative rotation of the races. The sealing flap 27 secured to the inner race and bearing against the upper edge 29 of the outer race forms a gas tight seal while allowing the races to rotate freely. Thus, the separable bearing unit allows relative rotation between two adjacent elements of a pressurized garment while at the same time transmitting a gas or a fluid.

Obviously many modifications and variations of the present invention are possible in the light of the above teachings. It is therefore to be understood that within the scope of the appended claim the invention may be practiced otherwise than as specifically described.

What is claimed is:

A separable bearing for joining two adjacent elements of a pressurized garment whereby the joint is air tight while at the same time freedom of rotation between the elements is allowed said bearing comprising an inner race consisting of two separate arcuate sections, means on one end of each arcuate section for securing the section to an element of the pressurized garment, a flange on the other end of each arcuate section, an outer race consisting of two semi-circular sections, a hinge pivotally connecting the semi-circular sections, a plurality of miniature roller bearings mounted in said outer race and engaging said flange so that the longitudinal axes of the said bearings lie in a common plane for providing thrust motion, a plurality of additional miniature roller bearings mounted in the outer race with the longitudinal axes of the second mentioned bearings perpendicular to the said common plane for providing a radial motion, a locking bar and pin means on the outer race for holding the separable bearing in assembled position, means on each section of the outer race for fastening an element of a pressurized garment thereto and a sealing flap mounted on the flange and urged against the outer race to form a gas tight seal between the inner and outer races.

References Cited in the file of this patent

UNITED STATES PATENTS

| | | |
|---|---|---|
| 1,349,060 | Gall et al. | Aug. 10, 1920 |
| 1,762,065 | Lally | June 3, 1930 |
| 2,034,637 | Mooney | Mar. 17, 1936 |

FOREIGN PATENTS

| | | |
|---|---|---|
| 28,844 | Great Britain | Dec. 11, 1911 |